United States Patent [19]

Fujioka et al.

[11] Patent Number: 5,494,750

[45] Date of Patent: Feb. 27, 1996

[54] HEAT-CURABLE SILICONE ELASTOMER COMPOSITION

[75] Inventors: Kazutoshi Fujioka, Pittsburgh, Pa.; Takashi Kondou; Takeo Yoshida, both of Annaka, Japan

[73] Assignee: Shin-Etsu Chemical Co., Ltd., Tokyo, Japan

[21] Appl. No.: 240,472

[22] Filed: May 10, 1994

[30] Foreign Application Priority Data

May 10, 1993 [JP] Japan ................................ 5-132659

[51] Int. Cl.$^6$ ............................ B32B 25/20; C08K 9/10; C08L 83/04
[52] U.S. Cl. .................... 428/402.21; 428/405; 428/407; 523/211; 524/862; 525/478
[58] Field of Search ........................... 523/211; 524/862; 525/478; 428/402.21, 405, 407

[56] References Cited

U.S. PATENT DOCUMENTS

| | | | |
|---|---|---|---|
| 3,445,420 | 5/1969 | Kookootsedes et al. | 528/15 |
| 4,481,341 | 11/1984 | Schlak et al. | 523/211 |
| 5,204,384 | 4/1993 | Matsushita et al. | 523/211 |
| 5,232,959 | 8/1993 | Togashi et al. | 523/211 |

OTHER PUBLICATIONS

Van Nostrands Scientific Encyclopedia, Seventh Edition, Van Nostrand Reinhold, New York (1989), pp. 2240, 2241, 2426, 2427 and 2428.

*Primary Examiner*—Ralph H. Dean
*Assistant Examiner*—Karen A. Dean
*Attorney, Agent, or Firm*—Oblon, Spivak, McClelland, Maier & Neustadt

[57] ABSTRACT

A heat-curable silicone elastomer composition comprising (A) a thermoplastic resin containing a platinum catalyst and a hydrosilylation reaction retarding agent, (B) an organopolysiloxane having at least two unsaturated aliphatic hydrocarbon groups bonded to silicon atoms in its molecule, and (C) an organohydrogenpolysiloxane having at least two silicon-bonded hydrogen atoms in its molecule. The composition is excellent in storage stability. That is, even when stored for a long time, the composition has good stability at room temperature and retains curability at high temperatures.

11 Claims, No Drawings

HEAT-CURABLE SILICONE ELASTOMER COMPOSITION

BACKGROUND OF THE INVENTION

1. Field of the Invention

The present invention relates to a heat-curable silicone rubber composition capable of curing through hydrosilylation reaction which is used for potting materials, coating materials, adhesives, liquid injection molding materials and so forth.

2. Description of the Prior Art

Heat-curable type silicone elastomer compositions which cure through hydrosilylation reaction have such advantages as curing rapidly and giving no reaction by-products, and are used for potting materials, coating materials, adhesives, liquid injection molding materials and the like.

However, because of difficulties in controlling the catalyst activity used for the hydrosilylation reaction, the heat-curable silicone elastomer compositions have been used in the form of two-part type compositions. In using such a two-part type composition for coating materials and the like, the two parts must be mixed together, which leads to workability problems such as complicated operations.

For control of catalyst activity at room temperature, therefore, a proposal has been made of a one-part type heat-curable silicone elastomer composition which incorporates a hydrosilylation reaction retarding agent. As the controlling agent, have been used, for example, nitrile compounds; carboxylates; stannous, mercuric and the like metallic compounds; sulfur compounds; benzotriazole; acetylene compounds; hydroperoxides and so forth. One-part type compositions containing such a controlling agent show good stability at room temperature. However, the addition of the reaction retarding agent to a composition in order to obtain long-term storage stability results in marked lowering in the curability of the composition. In order to retain curability of a composition, on the other hand, the addition amount of the controlling agent should be reduced, so that the resulting composition is poor in storage stability.

In view of the above, one-pack type heat-curable silicone elastomer compositions have been developed which are obtained by adding a platinum catalyst encapsulated in a silicone resin having a certain softening point (hereinafter referred to as "catalyst-containing resin") to an elastomer composition (Refer to Japanese Patent Publication (KOKOKU) No. 53-41707 (1978) and U.S. Pat. No. 4,481,341 corresponding to Japanese Pre-examination Patent Publication (KOKAI) No. 58-37053 (1983)). This method, however, has the problem that at the time of encapsulating the platinum catalyst in the silicone resin, a tiny amount of the catalyst deposits on the surface of the resin. The catalyst thus deposited on the surface of the catalyst-containing resin promotes curing of the silicone composition during storage. The one-part type elastomer composition obtained in this manner, therefore, are low in storage stability (the term "storage stability" hereinbelow refers to the property of retaining room-temperature stability and high-temperature curability for a long time).

To overcome the above problem, a composition in which the abovementioned catalyst-containing resin and hydrosilylation reaction retarding agent are incorporated separately has been proposed (Refer to Japanese Pre-examination Patent Publication (KOKAI) No. 4-46962 (1992)). The one-pack type heat-curable silicone elastomer composition thus obtained has good stability at room temperature over a long period. To obtain the stability, however, the reaction retarding agent must be added to the composition in an excess amount. The excess amount of the controlling agent permeates the catalyst-containing resin with the lapse of time, so that the compositions of this type are low in storage stability and their curability at high temperature is lowered with the lapse of time, thereby making them unsuited to practical use.

SUMMARY OF THE INVENTION

It is accordingly an object of the present invention to provide a heat-curable silicone elastomer composition which has excellent storage stability and retains good stability at room temperature and high-temperature curability even when stored for a long time.

As a result of the present inventors' studies made for attaining the above object, it was found out that addition of a thermoplastic resin containing a platinum catalyst for a hydrosilylation reaction and a hydrosilylation reaction retarding agent yields unexpectedly a heat-curable silicone elastomer composition with excellent storage stability, namely, an elastomer composition retaining good room-temperature stability and high-temperature curability for a long time.

Namely, the present invention provides a heat-curable silicone elastomer composition comprising:

(A) a thermoplastic resin containing a platinum catalyst and a hydrosilylation reaction retarding agent, (B) an organopolysiloxane having at least two unsaturated aliphatic hydrocarbon groups bonded to silicon atoms in its molecule, and (C) an organohydrogenpolysiloxane having at least two silicon-bonded hydrogen atoms in its molecule.

According to the present invention, there is provided a heat-curable silicone elastomer composition having excellent storage stability, namely, retaining good room-temperature stability and high-temperature curability.

DETAILED DESCRIPTION OF PREFERRED EMBODIMENTS (A) Thermoplastic resin containing a platinum catalyst and a reaction retarding agent The thermoplastic resin containing a platinum catalyst for a hydrosilylation reaction and a hydrosilylation reaction retarding agent of component (A) is added for crosslinking the organopolysiloxane containing an unsaturated aliphatic hydrocarbon group of component (B) with the organohydrogenpolysiloxane of component (C).

Platinum catalyst

The platinum catalyst includes, for example, platinum and platinum compounds, which may be those known and conventionally used for hydrosilylation reaction. Specific examples include platinum, chloroplatinic acid, platinum sulfide, sodium chloroplatinate, platinum-olefin complexes, complexes of chloroplatinic acid with an alkenyl-containing organosiloxane. These compounds may be either supported on an inorganic compound such as silica, carbon black, aluminum, titanium oxide and the like or dissolved in an alcohol when put to use. These platinum catalysts may be used either singly or in combination of two or more. Among the platinum catalysts, preferred are chloroplatinic acid and divinylsiloxane in view of high catalytic activity.

The platinum catalyst is preferably used in an amount of not more than 50 parts by weight, more preferably 0.1 to 10 parts by weight, per 100 parts by weight of a thermoplastic resin. If the amount is too large, hydrosilylation reaction cannot be controlled easily, whereas if the amount is too small, satisfactory curability cannot be obtained.

Hydrosilylation reaction retarding agent

The hydrosilylation reaction retarding agent may be any of those conventionally used, for example, phosphorus compounds such as triphenylphosphine and the like; nitrogen-containing compounds such as tetramethylethylenediamine, benzotriazole and the like; acetylene compounds such as propargyl alcohol, 1-ethynylcyclohexanol, 1,1-dimethyl-3-butynol and the like; hydroperoxide compounds such as t-butyl hydroperoxide and the like; tin compounds such as dibutyltin dilaurate, tin octoate and the like; and mercury compounds such as mercury(I) chloride. These compounds may be used either singly or in combination of two or more. Among these compounds, preferred are acetylene compounds, and more preferred are organic compounds which have an alkynyl group and alcoholic hydroxyl group in a molecule.

The hydrosilylation reaction retarding agent is preferably used in an amount of not more than 100 moles, more preferably 1 to 10 moles, per mole of platinum atoms in the above platinum catalyst. If the amount is too large, a composition with satisfactory curability cannot be obtained, whereas if the amount is too small, hydrosilylation reaction can be controlled with difficulty, and the resulting composition is poor in stability at room temperature.

Thermoplastic resin

The thermoplastic resin includes, for example, vinyl polymers such as polyethylene, polystyrene and the like; condensation-type polymers such as polyamides, polyesters and the like; and organic polymers such as silicone resins and so forth. There can be used either singly or in combination of two or more. Among the resins, preferred are silicone resins, and more preferred are silicone resins having the average composition formula:

$$R_a SiO_{(4-a)2} \quad (1)$$

wherein R is a monovalent organic group, and a is a number of 1 to 1.8, preferably 1 to 1.5. In the formula (1), the monovalent organic groups represented by R include unsubstituted or substituted monovalent hydrocarbon groups free from aliphatic unsaturated bond normally having from 1 to 12 carbon atoms, preferably from 1 to 8 carbon atoms, for example, alkyl groups such as methyl, ethyl, propyl and the like; aryl groups such as phenyl, tolyl and the like; organic groups derived from hydrocarbon groups by substitution of a part or all of hydrogen atoms with halogen atoms or cyan groups, such as trifluropropyl, chloromethyl and cyanoethyl, and so forth. These organic groups may be incorporated in the formula (1) either singly or in combination. It is preferable that phenyl groups are present in an amount of 55 mol % or more based on the R's in the formula (1).

Preferable examples of the silicone resin having the formula (1) include, for example,

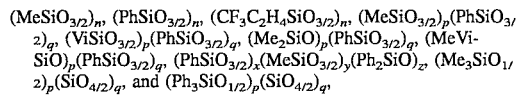

wherein in the above formulas, p, q, x, y and z are each an integer of not less than 1; n, p+q and x+y+z are each an integer of not less than 10; Me stands for the methyl group; Ph stands for the phenyl group; and Vi stands for the vinyl group. These silicone resins may be used either singly or in combination of two or more.

The thermoplastic resin is used for encapsulating the platinum catalyst to prevent hydrosilylation reaction from taking place during storage at room temperature and, hence, should be a solid which is stable at room temperature. Therefore, the resin preferably has a melting or softening point of 40° to 150° C. If the melting or softening point is too low, the catalyst will diffuse into the composition during stage at room temperature, to cause hydrosilylation reaction with the result of curing. If the melting or softening point is too high, it is necessary to cure the composition at a higher temperature, and the desired curability cannot be obtained. Besides, the thermoplastic resin should not dissolve into the composition prepared.

The thermoplastic resin containing the above platinum catalyst and reaction retarding agent has preferably been diffused uniformly in the composition when the composition is used. The thermoplastic resin is not particularly restricted in form, but is preferably a fine-grained powder or particles. The fine-grained powder or particles preferably have a particle size of 0.1 μm to 1 mm, more preferably about 1 to 100 μm. For preparation of the fine-grained powder or particles, known methods can be used. The known methods include, for example, a method using a spray dryer or the like.

The thermoplastic resin (A) containing the above platinum catalyst and reaction retarding agent is contained in the composition in an amount such that the amount of platinum contained in the composition is preferably 1 to 1000 ppm, more preferably 10 to 100 ppm, based on the component (B).

(B) Organopolysiloxane having unsaturated aliphatic hydrocarbon group

The organopolysiloxane having at least two unsaturated aliphatic hydrocarbon groups bonded to silicon atoms in its molecule of component (B) is a principal ingredient of the heat-curable silicone elastomer composition according to the present invention.

The unsaturated aliphatic hydrocarbon groups in the organopolysiloxane include ones normally having from 2 to 10 carbon atoms, preferably having from 2 to 4 carbon atoms, for example, alkenyl groups such as vinyl, allyl, isopropenyl and the like. These may be present either singly or in combination of two or more kinds thereof. The unsaturated aliphatic hydrocarbon groups can be bonded to the silicon atom located at the end of the molecule and/or in the middle of siloxane skeleton in the molecule, preferably bonded to the silicon atoms at the both ends of the molecular chain. Among these, preferred is the vinyl group. The organic groups in the organopolysiloxane other than the unsaturated aliphatic hydrocarbon groups include unsubstituted or substituted monovalent hydrocarbon groups normally having from 1 to 12 carbon atoms, preferably having from 1 to 8 carbon atoms, for example, alkyl groups such as methyl, ethyl, propyl and the like; aryl groups such as phenyl, tolyl and the like; and organic groups derived from hydrocarbon groups by substitution of a part or all of hydrogen atoms with halogen atoms or cyano groups, such as trifluoropropyl, chloromethyl, cyanoethyl and so forth. In the molecule of the organopolysiloxane, the other organic groups than the unsaturated aliphatic hydrocarbon groups are not necessarily be of the same kind.

In structure, the organopolysiloxane may, for example, be linear, branched or cyclic, and is preferably linear. Where the organopolysiloxane has a linear structure, it may have a branched or cyclic skeleton in part.

Where a liquid composition is to be obtained, the organopolysiloxane preferably has a polymerization degree of 20 to 2000, more preferably 50 to 500. Where the composition is to be obtained as a non-liquid rubber, the organopolysiloxane preferably has a polymerization degree of not less than 2000.

(C) Organohydrogenpolysiloxane

The organohydrogenpolysiloxane having at least two silicon-bonded hydrogen atoms in its molecule of component (C) is a component for forming crosslinks through hydrosilylation reaction with the organopolysiloxane of component (B). Besides the silicon-bonded hydrogen atoms, the organohydrogenpolysiloxane has silicon-bonded organic groups which include unsubstituted or substituted monovalent hydrocarbon groups free from aliphatic unsaturated bond normally having from 1 to 12 carbon atoms, preferably having from 1 to 8 carbon atoms, for example, alkyl groups such as methyl, ethyl, propyl and the like; aryl groups such as phenyl, tolyl and the like; and organic groups derived from hydrocarbon groups by substitution of a part or all of hydrogen atoms with halogen atoms or cyano groups, such as trifluoropropyl, chloromethyl, cyanoethyl and so forth. The organic groups in the organohydrogenpolysiloxane are not necessarily of the same kind.

In structure, the organohydrogenpolysiloxane may, for example, be linear, branched, cyclic or network structure, and is preferably linear. Where the organohydrogenpolysiloxane has a linear structure, it may have a branched or cyclic skeleton in part.

The organohydrogenpolysiloxane preferably has a polymerization degree of 3 to 300, more preferably 5 to 100.

The organohydrogenpolysiloxane includes, for example, compounds represented by the formulas:

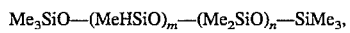

wherein m is an integer of 2 or more and n is an integer of 0 or more, provided that m+n ranges from 3 to 100,

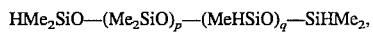

wherein p is an integer of 0 or more and q is an integer of 0 or more, provided that p+q ranges from 3 to 100, and

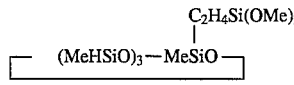

The amount of the organohydrogenpolysiloxane in the composition is such that the molar ratio of the silicon-bonded hydrogen atoms in the organohydrogenpolysiloxane molecules to the silicon-bonded unsaturated aliphatic hydrocarbon groups in the organopolysiloxane molecules is from 1/10 to 12/1, preferably from 1/1 to 3/1.

The organohydrogenpolysiloxanes of component (C) may be used either singly or in combination of two or more.

Other ingredients

The composition of the present invention may, if necessary, incorporates fillers such as particulate silica and calcium carbonate; heat-resisting agents such as iron oxide; flame retardants such as carbon black; adhesiveness-imparting agents; thixotropy agents and the like.

Preparation of composition

To prepare the composition of the present invention, for example, predetermined amounts of the above-described components (A) to (C) and other compounding ingredients which are optionally added as required are mixed uniformly in a dry atmosphere, whereby a heat-curable composition is obtained. The preparation of the composition can be easily carried out by an apparatus used for ordinary kneading, for example, kneaders, mixers, roll mills and the like.

EXAMPLES

The present invention will now be described more in detail below, with reference to non-limitative examples and comparative examples. In the examples below, H/Vi stands for the molar ratio of the silicon-bonded hydrogen atoms in the organohydrogenpolysiloxane molecule of component (C) to the silicon-bonded vinyl groups in the organopolysiloxane of component (C). In the following, "parts" means "parts by weight".

(A) Preparation example of thermoplastic resin containing a platinum catalyst and a reaction-retarding agent Catalyst (1)

In a glass vessel, 100 g of a silicone resin with a softening point of 80° C. obtained by hydrolyzing a mixture of 70 mol % of phenyltrichlorosilane, 25% of methyltrichlorosilane and 5 mol % of diphenyldichlorosilane was dissolved in dichloromethane. Then, 10 g of a solution of a platinum complex (obtained by neutralizing a mixture of chloroplatinic acid and divinyltetramethyldisiloxane with sodium hydrogen carbonate) in toluene (platinum content: 5 wt. %) was mixed with 0.5 g of 1-ethynylcyclohexanol, and the resulting mixture was allowed to stand overnight.

The mixture thus obtained was treated by a spray dryer (inlet temperature: 90° C., outlet temperature: 40° C.), to give 60 g of silicone resin particulates having an average particle diameter of 20 μm and containing the platinum complex and the like. The particulate silicone resin is referred to as "catalyst (1)". The catalyst (1) had a platinum content of 0.4 wt. %.

Catalyst (2)

The preparation of catalyst (1) above was repeated except for using 0.34 g 1,1-dimethyl-3-butynol in place of 1-ethynylcyclohexanol, to yield 60 g of particulates (average particle diameter: 20 μm) of a silicone resin containing a platinum complex and the like. The particulate silicone resin thus obtained is referred to as "catalyst (2)". The catalyst (2) had a platinum content of 0.4 wt. %.

Catalyst (3)

The preparation of catalyst (1) above was repeated except that 1-ethynylcyclohexanol was not added, to yield 60 g of particulates (average particle diameter: 20 μm) of a silicon resin containing a platinum complex. The particulate silicon resin is referred to as "catalyst (3)". The catalyst (3) had a platinum content of 0.5%.

Example 1

A hundred parts of α,ω-divinylmethylpolysiloxane having an average polymerization degree of 500 was mixed with 20 parts of a fumed silica having a specific surface area of 170 m²/g which had been treated with hexamethyldisilazane to have trimethylsiloxyl units at the surfaces thereof and be thereby hydrophobic, and a base compound was thus obtained. To 100 parts of the base compound were added 2.0 parts of a siloxane having the formula:

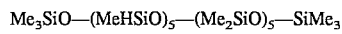

wherein Me stands for the methyl group (so that H/Vi=2.7) and 0.5 part of the catalyst (1) prepared above, followed by mixing uniformly. The resulting mixture was kneaded with a three-roll mill to obtain a composition, which will be referred to as "composition I".

Comparative Example 1

A comparative composition i was prepared in the same manner as in Example 3 except for using the catalyst (3) in place of the catalyst (1).

Example 2

A hundred parts of α,ω-divinyldimethylpolysiloxane having an average polymerization degree of 450 was mixed with 30 parts of a fumed silica having a specific surface area of 130 m$^2$/g which had been treated with hexamethyldisilazane to have trimethylsiloxyl units at the surfaces thereof and be thereby hydrophobic, and a base compound was thus obtained. To 100 parts of the base compound were added 1.5 parts of a siloxane having the formula:

$HMe_2SiO-(Me_2SiO)_5-(MeHSiO)_3-SiHMe_2$ wherein Me stands for the methyl group, 1.0 part of a siloxane having the following formula:

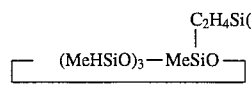

wherein Me stands for the methyl group (so that H/Vi=2.4), and 0.5 g of the catalyst (2) prepared above, followed by mixing uniformly. The resulting mixture was kneaded with a three-roll mill to obtain a composition, which will be referred to as "composition II".

Comparative Example 2

A comparative composition ii was prepared in the same manner as in Example 2 except that 0.05 g of a toluene solution of a platinum complex coordinated with divinyltetramethyldisiloxane (platinum content: 0.5 wt. %) was added in place of the catalyst (2) and 0.8 g of 1,1-dimethyl-3-butynol was added to a base compound.

Example 3

A kneader-mixer was charged with 100 parts of a dimethylpolysiloxane gum blocked with dimethylvinylsilyl group at both ends and having a polymerization degree of 6000 (vinyl content: 0.0020 mol/100 g), 10 parts of α,ω-dihydroxydimethylpolysiloxane and 40 parts of a fumed silica having a specific surface area 300 m$^2$/g were kneaded in a kneader-mixer at 160° C. for 4 hours, to give a base compound. To 100 parts of the base compound were added 0.5 part of a siloxane having the formula:

$HMe_2SiO-(Me_2SiO)_5-(MeHSiO)_3-SiHMe_2$ wherein Me stands for the methyl group (so that H/Vi=2.6) and 0.5 part of the catalyst (2) prepared above, followed by mixing uniformly. The resulting mixture was kneaded with a three-roll mill to obtain a composition, which will be referred to as "composition III".

Comparative Example 3

A comparative composition iii was prepared in the same manner as in Example 3 except for adding the catalyst (3) in place of the catalyst (2) and adding 0.35 g of 1,1-dimethyl-3-butynol to the base compound.

Evaluation of Compositions

The compositions obtained in the examples and comparative examples were evaluated by the methods below. The results are given in Table 1.

Curing properties:

The compositions obtained in the examples and comparative examples above were evaluated as to curing properties at 150° C. by using a rheometer. The time required for a predetermined torque to be reached was measured for the compositions, and the respective measured values were compared with each other. In Table 1 below, T10 represents the time required for the torque to reach 10% of its maximum value, and T90 for the torque to reach 90% of its maximum value. The evaluation of curing properties at 150° C. was made also with respect to the compositions after stored at 25° C. for a predetermined period of time.

Physical properties:

Each composition was press cured at 120° C. for 5 minutes, and a sheet 2 mm thick was formed therefrom. The sheets thus formed was measured for physical properties in accordance with JIS K 6301. Hardness measurement was made using a Type A spring hardness tester.

TABLE 1

|  | Composition No. | Duration of storage | Curing properties T10, T90 (sec) | Physical properties ||||
|---|---|---|---|---|---|---|---|
|  |  |  |  | Hardness | Tensile strength (kgf/cm$^2$) | Elongation (%) | Tear strength (kgf/cm) |
| Example 1 | Composition I | *1 | 29, 45 | 30 | 55 | 450 | 16 |
|  |  | 10 days | 29, 45 | — | — | — | — |
| Comparative Example 1 | Comparative composition i | *1 | 5, 19 | 30 | 53 | 440 | 15 |
|  |  | 10 days | *2 | — | — | — | — |
| Example 2 | Composition II | *1 | 22, 36 | 40 | 72 | 500 | 20 |
|  |  | 1 month | 23, 40 | — | — | — | — |
| Comparative Example 2 | Comparative composition ii | *1 | 25, 40 | 39 | 70 | 510 | 18 |
|  |  | 1 month | *2 | — | — | — | — |
| Example 3 | Composition III | *1 | 18, 28 | 25 | 84 | 720 | 30 |
|  |  | 3 months | 20, 31 | — | — | — | — |
| Comparative Example 3 | Comparative composition iii | *1 | 20, 32 | 24 | 85 | 750 | 33 |
|  |  | 3 months | 66, 95 | — | — | — | — |

Notes
* 1: Immediately after preparation.
* 2: Could not be measured.

As seen from Table 1, there were marked differences in curing properties between the examples and the comparative examples.

The composition I, after stored at 25° C. for 10 days, exhibited the same curing properties as immediately upon preparation thereof.

The composition II, after stored at 25° C. for one month, showed the same curing properties as immediately upon preparation thereof. On the other hand, the comparative composition ii showed gelation when stored at 25° C. only for 24 hours.

The composition III exhibited the same curing properties as immediately upon preparation thereof, even after stored at 25° C. for 3 months. In contrast to this, the comparative composition iii showed a considerable degradation in curing properties after stored at 25° C. for 3 months. Furthermore, observation of the comparative composition iii after stored at 25° C. for 3 months revealed an increase in plasticity of the composition and formation of a gelled thin film at the surface of the composition.

What is claimed is:

1. A heat-curable silicone elastomer composition comprising:
   (A) a thermoplastic resin with a melting or softening point of 40° to 150° C. containing a platinum catalyst and a hydrosilylation reaction retarding agent and being in the form of fine-grained powder or particles having a particle size of 0.1 μm to 1 mm, in which both the platinum catalyst and the reaction retarding agent are associated with the thermoplastic resin, the amount of the platinum catalyst contained in the thermoplastic resin being not more than 50 parts by weight per 100 parts by weight of the thermoplastic resin, and the amount of the hydrosilylation reaction retarding agent contained in the thermoplastic resin being not more than 100 moles per mole of the platinum atoms contained in the platinum catalyst,
   (B) an organopolysiloxane having at least two unsaturated aliphatic hydrocarbon groups bonded to silicone atoms in its molecule, and
   (C) an organohydrogenpolysiloxane having at least two silicon-bonded hydrogen atoms in its molecule;
   the amount of the component (A) in the composition being such that the amount of the platinum contained in the composition is 1 to 1000 ppm based on the amount of the component (B), and
   the amount of the component (C) in the composition being such that the molar ratio of the silicon-bonded hydrogen atoms in the component (C) to the silicon-bonded unsaturated aliphatic hydrocarbon groups in the component (B) is from 1/10 to 12/1.

2. The composition of claim 1, wherein said platinum catalyst comprises a member selected from the group consisting of platinum, chloroplatinic acid, platinum sulfide, sodium chloroplatinate, platinum-olefin complexes, complexes of chloroplatinic acid with an alkenyl-containing organosiloxane, and these compounds supported on an inorganic compound or dissolved in an alcohol.

3. The composition of claim 1, wherein said hydrosilylation reaction retarding agent comprises a compound selected from the group consisting of triphenylphosphine, tetramethylethylenediamine, benzotriazole, propargyl alcohol, 1-ethynylcyclohexanol, 1,1-dimethyl-3-butynol, t-butyl hydroperoxide, dibutyltin dilaurate, tin octoate and mercury(I) chloride.

4. The composition of claim 1, wherein said thermoplastic resin comprises a resin selected from the group consisting of polyethylene, polystyrene, polyamides, polyesters and silicone resins.

5. The composition of claim 1, wherein said thermoplastic resin comprises a silicone resin having an average composition formula (1):

wherein R is a monovalent organic group, and a is a number of 1 to 1.8.

6. The composition of claim 5, wherein R in the average composition formula (1) is a group selected from the group consisting of alkyl groups, aryl groups and groups derived from these hydrocarbon groups by substitution of a part or all of the hydrogen atoms with halogen atoms or cyano groups.

7. The composition of claim 5, wherein said silicone resin having the average composition formula (1) is a member selected from the group consisting of

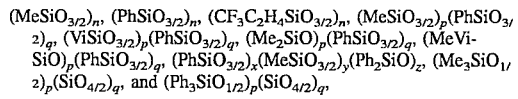

wherein in the above formulas, p, q, x, y and z are each an integer of not less than 1; n, p+q and x+y+z are each an integer of not less than 10; Me stands for the methyl group; Ph stands for the phenyl group; and Vi stands for the vinyl group.

8. The composition of claim 1, wherein the amount of the component (A) is 1 to 1000 ppm, in terms of platinum in the component (A), based on the amount of the component (B).

9. The composition of claim 1, wherein said unsaturated aliphatic hydrocarbon groups of component (B) comprises a group selected from the group consisting of vinyl, allyl and isopropenyl groups.

10. The composition of claim 1, wherein said organohydrogenpolysiloxane of component (C) comprises a compound selected from the group consisting of:

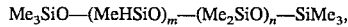

wherein m is an integer of 2 or more and n is an integer of 0 or more, provided that m+n ranges from 3 to 100,

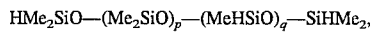

wherein p is an integer of 0 or more and q is an integer of 0 or more, provided that p+q ranges from 3 to 100, and

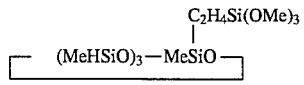

wherein in the formulas above, Me stands for the methyl group.

11. The composition of claim 1, wherein the component (C) comprises a linear organohydrogenpolysiloxane having a polymerization degree of 3 to 300.

* * * * *